United States Patent [19]
DeLange, III

[11] Patent Number: 5,259,582
[45] Date of Patent: Nov. 9, 1993

[54] EXTENSION MOUNTING ARMS AND ATTACHMENT DEVICES FOR REAR VIEW MIRRORS FOR PERSONAL RECREATIONAL VEHICLES

[76] Inventor: William DeLange, III, 2814 S. Fremont, Springfield, Mo. 65804

[21] Appl. No.: 901,806

[22] Filed: Jun. 22, 1992

[51] Int. Cl.⁵ .............................................. A47G 1/24
[52] U.S. Cl. ..................................... 248/481; 359/871
[58] Field of Search ............... 248/476, 479, 480, 481, 248/475.1; 359/871, 872

[56] References Cited

U.S. PATENT DOCUMENTS

| | | | |
|---|---|---|---|
| 2,803,733 | 8/1957 | Kahirsky | 248/480 X |
| 4,123,030 | 10/1978 | Johansson | 248/478 |
| 4,281,815 | 8/1981 | O'Connell et al. | 248/479 |
| 4,315,614 | 2/1982 | Stegenga et al. | 248/479 |
| 4,715,701 | 12/1987 | Urban | 359/871 X |
| 4,991,814 | 2/1991 | Schmidt et al. | 248/479 |
| 5,039,055 | 8/1991 | Lempelius | 248/480 |
| 5,107,374 | 4/1992 | Lupo et al. | 248/480 |

OTHER PUBLICATIONS

Universal-Mounting Boat Mirror N. A. Taylor Co., Inc. Gloversville, N. Y. Instruction Sheet PBL 76-1.

*Primary Examiner*—Ramon O. Ramirez
*Attorney, Agent, or Firm*—Richard L. Marsh

[57] ABSTRACT

This invention relates to novel constructions of rearward viewing devices consisting of extension arms and mounting attachment devices with convex marine mirrors for use by the operators of most modern watercraft having other than side to side dashboards or metal framed windshields. This invention provides for substantially 180 degree viewing behind the craft by the operator of such aforementioned craft for the purpose of rear vision for safety whether or not towing another craft or person or persons engaged in any water sport such as skiing, boarding, tubing, etc., when the operator is without another person on board as a legal spotter.

12 Claims, 5 Drawing Sheets

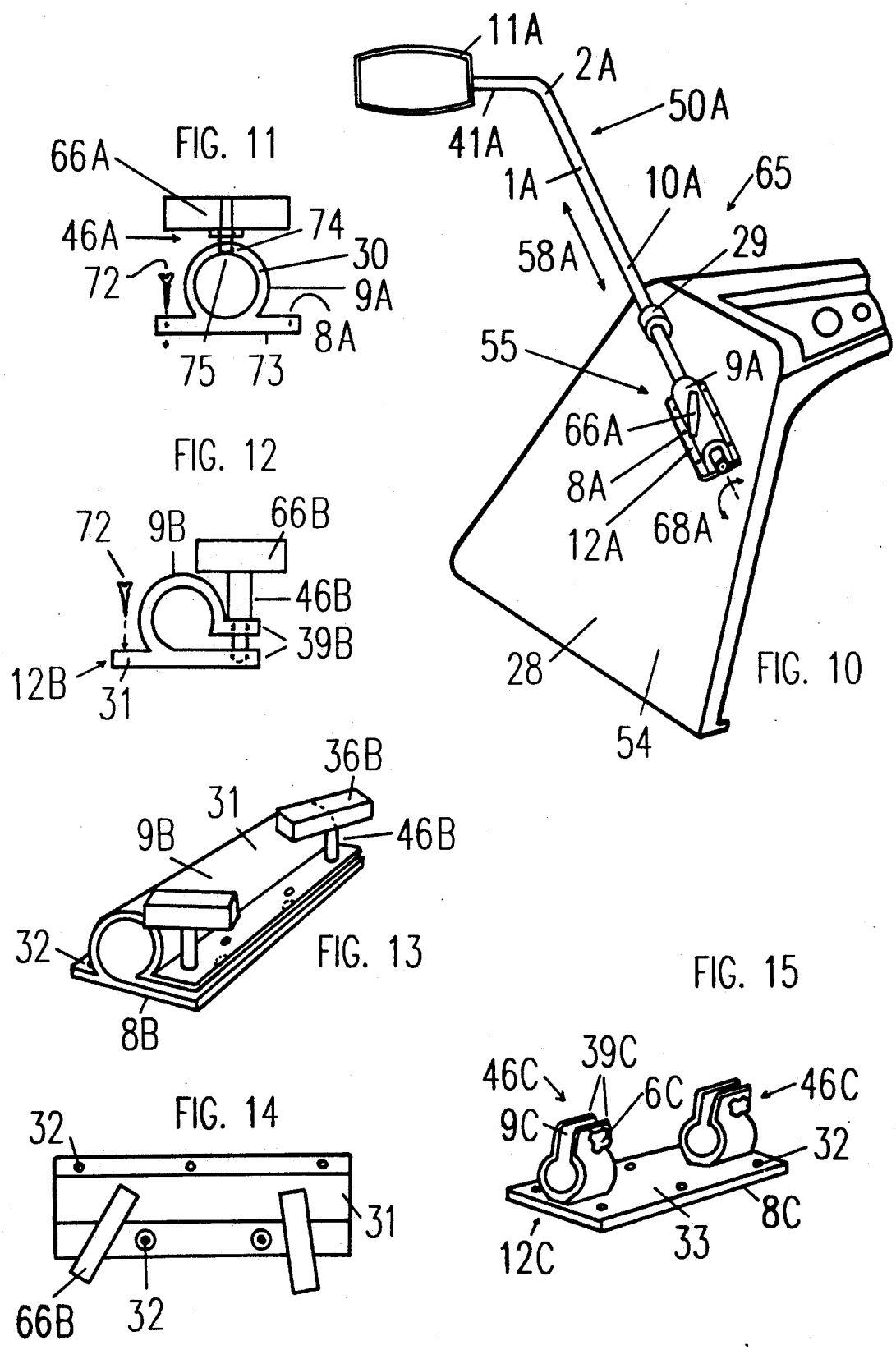

EXTENSION MOUNTING ARMS AND ATTACHMENT DEVICES FOR REAR VIEW MIRRORS FOR PERSONAL RECREATIONAL VEHICLES

BACKGROUND OF THE INVENTION

1. Field of the Invention

This invention relates to removable, adjustable rearward viewing devices adapted to be mounted on a portion of a personal recreational vehicle such as watercraft, snowmobiles or the like to enable operators thereof to safely operate said vehicle by providing means for rearward viewing.

2. Prior Art Statement

Many accidents occur every year worldwide resulting in injury or death to those engaged in recreational activities such as skiing, tubing, knee-boarding, sledding, kiting, surfing and the like while being towed by watercraft operated by an individual without a legal spotter or adequate marine mirror properly placed to allow the operator means of rearward viewing. Marine mirrors currently on the market are not designed to be mounted properly upon many watercraft and especially are unsuited for mounting on modern low profile style consoles whether or not the console is fitted with a low profile wind deflector. Such marine mirrors are adapted to fit over the metal frame of a windshield commonly found on watercraft with full beam width dashboards or walk through consoles and to be permanently attached thereto with at least one set screw. Such mirrors may also be mounted on a flat horizontal surface, such as the aforementioned dashboard and be permanently attached thereto. For instance, see the installation instructions provided with the device identified as Universal-Mounting Boat Mirror, manufactured by N. A. Taylor Co. Inc., Gloversville, N.Y.

It is also known in the art to provide a rear-view mirror arrangement which can be detachably mounted to a vertical linear edge of a window of a vehicle. For instance, see the U.S. Pat. No. 4,123,030 to Johansson.

It is further known in the art to provide an adjustable and extendable mount for a mirror having a second tubular arm telescopically joined to a horizontally disposed first arm. For instance, see the U.S. Pat. No. 5,039,055 to Lempelius.

Finally, it is known to provide a reversible mirror assembly wherein the detachable mirror housing has two alternative, substantially opposite orientations. For instance, see the U.S. Pat. 4,991,814 to Schmidt, et al.

The existing products however, are impractical or ineffective for adequate rear vision when mounted on personal recreational vehicles such as most modern watercraft, as the low profile consoles utilized therewith are generally located directly forward of the operator with the highest horizontal surface as much as twelve (12) inches below the operator eye level. The existing products are also unsuited for mounting to a personal recreational vehicle fitted with a wind deflector as the top edge of the wind deflector is still at least six (6) inches below the operator eye level. A conventional mirror such as those above would afford the operator of such a vehicle with only a very limited peripheral view to the extreme right and left.

As is readily apparent, presently there are no known products or accessories available in the industry which afford operators of personal recreational vehicles with adequate rearward vision. Accordingly, there exists a need for a rearward viewing device which can be mounted to the new style, low profile or split console watercraft and particularly to the low profile plastic wind deflectors mounted thereon.

Furthermore, there exists a need for a marine style mirror which can be mounted to personal recreational vehicles such as snowmobiles, all terrain vehicles and the like which have a console and/or wind deflector mounted thereon.

OBJECTS OF THE INVENTION

It is a primary objective of this invention to provide operators of personal recreational vehicles such as watercraft, snowmobiles, all terrain vehicles and the like equipped with low profile consoles, a practical means by which to achieve optimal rearward vision with minimum obstruction by providing a rearward viewing device with unique adjusting means having an arm, a mirror mounting, a viewing device mount and a mirror wherein said viewing device mount is adapted to be releasably attached to a portion of the vehicle. The adjusting means is adapted to provide for any orientation of the mirror relative to said vehicle and for rapid reorientation thereof.

It is another object of this invention to provide operators of vehicles such as watercraft, safe means of towing of other craft or persons engaged in water sports by providing the superior adjustable rearward viewing device of this invention thereby reducing the instance of injury or death to those being towed.

Yet another object of this invention is to provide operators of personal recreational vehicles a novel, useful product which can be easily detached and stowed when not in use and easily reattached when required.

Finally, it is an objective of this invention to provide a method of making a rearward viewing device for personal recreational vehicles equipped with low profile consoles, such as watercraft, snowmobiles, all terrain vehicles and the like, with unique adjusting means having an arm, a mirror mounting, a viewing device mount and a mirror wherein said viewing device mount is adapted to be releasably attached to a portion of the console of the vehicle.

BRIEF DESCRIPTION OF THE DRAWINGS

FIG. 10 is a perspective partial view of a console of a watercraft having a viewing device of this invention mounted thereon.

FIG. 11 is an end view of the viewing device mounting means of FIG. 10.

FIG. 12 is end view of another viewing device mounting means utilized in FIG. 10.

FIG. 13 is a perspective view of the viewing device mounting means of FIG. 12.

FIG. 14 is a top plan view of the viewing device mounting means of FIG. 12.

FIG. 15 is a perspective view of another viewing device mounting means utilized in FIG. 10.

DESCRIPTION OF THE PREFERRED EMBODIMENTS

Figure 1:
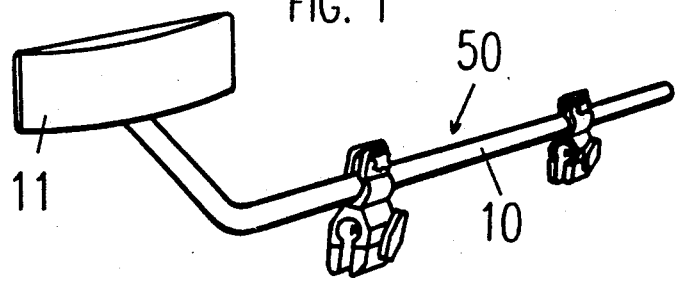
FIG. 1 is a perspective view of a rearward viewing device of this invention.

While the various features of this invention are hereinafter illustrated and described as providing a rearward viewing device adapted to mount upon a portion of a vehicle such as the console of a watercraft to provide safety to the operator and/or persons or other craft being towed, it is to be understood that the various features of this invention can be utilized singly or in any combination thereof to provide a viewing device for other vehicles as described.

Therefore, this invention is not to be limited to only the embodiments illustrated in the drawings, because the drawings are merely utilized to illustrate one of the wide variety of uses of this invention.

FIG. 1 shows a rearward viewing device of this invention generally indicated by the numeral 50 having a mirror 11 mounted upon one portion of an arm 10 and further having viewing device mounting means 12 disposed on another portion of arm 10.

Figure 2:
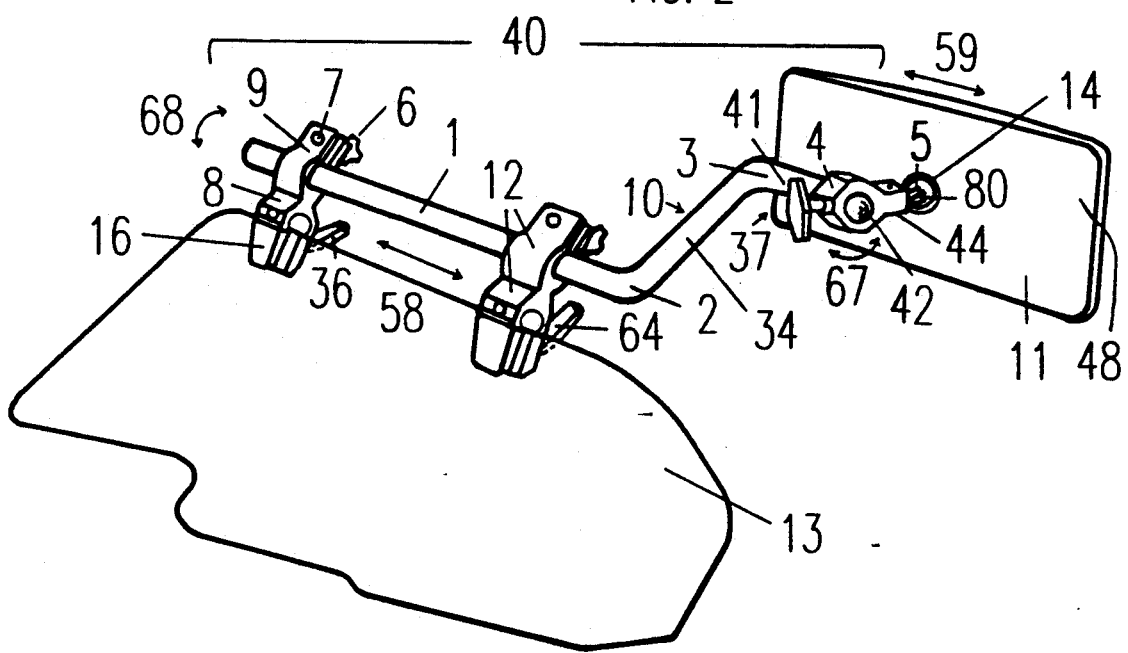
FIG. 2 is a front perspective view of the rearward viewing device of this invention mounted upon a part of one of the variety of projecting portions of a vehicle such as a watercraft.

Referring now to FIG. 2, the rearward viewing device 50 of FIG. 1 is adapted to be mounted upon a projecting portion 13 of a portion 65 of the console 28 shown in FIG. 10 of a vehicle (not shown) such as watercraft. Rearward viewing device 50 has adjusting means 40 comprising viewing device mounting means 12, an arm 10, a mirror mounting means 4, shown in FIG. 3 and a mirror 11 mounted thereon. Rearward viewing device 50 is quickly adjustable to a variety of positions and mountable upon a variety of projecting portions 13 providing safe and reliable operation of said vehicle.

Viewing device mounting means 12 comprises arm mounting means 9 and viewing device fixing means 8 wherein viewing device fixing means 8 is adapted to be releasably attached to said projecting portion 13 of portion 65 of a vehicle. Arm mounting means 9 and viewing device fixing means 8 are adapted to be rotatably mounted one to the other with set screw 17 threaded into arm mounting means 9 and further threaded into viewing device fixing means 8 thereby providing relative rotational motion between arm mounting means 9 and viewing device fixing means 8 as hereinafter described. Arm mounting means 9 has biasing means 46 adapted to releasably clamp said arm 10 in said arm mounting means 9 providing means for said arm 10 to be slidably and rotatably mounted therein.

Arm 10 has first straight portion 1 adapted to be mounted within said arm mounting means 9 and further has a second straight portion 41 displaced from said first straight portion 1 by a curved portion 2. Arm 10 may also have a third straight portion 34 and a second curved portion 3 whereby said second straight portion 41 is disposed parallel with and offset from first straight portion 1.

Figure 3:
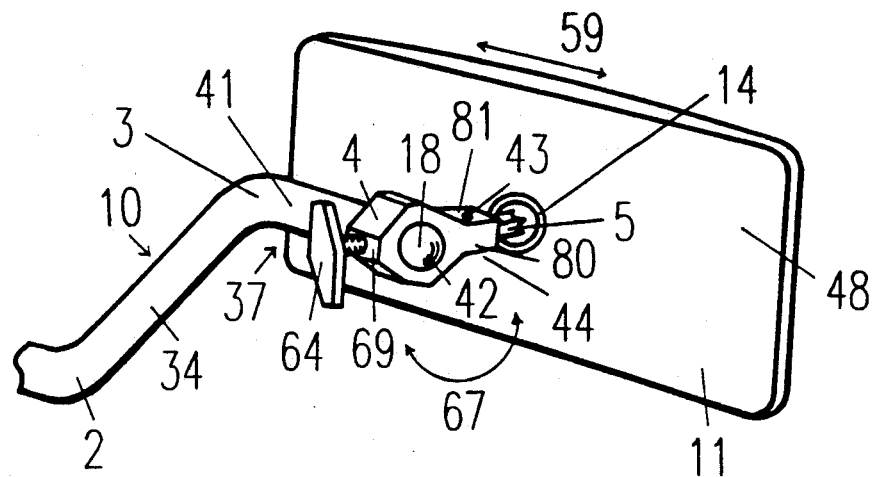
FIG. 3 is an enlarged perspective view of the mirror and mirror mounting means of FIG. 2.

Referring now to FIG. 3, mirror mounting means 4 has a hole 42 disposed therethrough and is thereby adapted to slide upon said second straight portion 41 of arm 10. Mirror mounting means 4 further has clamping means 37 associated therewith such as T-handle bolt 64 which is threaded into and through the rear surface 69 of mirror mounting means 4 and adapted to engage against second straight portion 41 of arm 10. Mirror 11 has a stud 5 projecting from the rear side 48 thereof and is adapted to fit within a receiving socket 44 within mirror mounting means 4. Stud 5 is usually square, but may of course be any desired shape and length. When placed in receiving socket 44, stud 5 is locked to mirror mounting means 4 by a set screw 43 as is known in the art. Stud 5 is adapted to be rotatably affixed to mirror 11 with a ball socket 14 disposed in the rear side 48 of mirror 11. Mirror 11 may then be adjusted to a final position by rotating stud 5 within ball socket 14. Mirror 11 may be any suitable mirror available upon the market, however is preferably of a convex surface design providing wide angle viewing such as the aforementioned Universal-Mounting Boat Mirror.

Adjusting means 40 therefore, provides for any orientation of mirror 11 upon projecting portion 13 of a vehicle. One skilled in the art readily appreciates that arm 10 may be rotated and/or translated within arm mounting means 9 and mirror mounting means 4 may also be rotated and translated upon second straight portion 41 of arm 10. Additionally, since mirror 11 may be rotated within ball socket 14, adjusting means 40 provides means for mirror 11 to be rotated and/or translated into a optimal position for rearward viewing by the operator while being affixed to said portion 65 of said console 28 of FIG. 10.

When said projecting portion 13 of said vehicle provides an undesirable mounting orientation for mirror 11, biasing means 46 of arm mounting means 9 may be released and arm 10 rotated therein according to arrow 68 providing for a new rotational position of adjusting means 40. Additionally, arm 10 may be moved laterally in the direction of double ended arrow 58 providing a new lateral position for adjusting means 40. Furthermore, clamping means 37 of mirror mounting means 4 may be released and mirror mounting means 4 moved laterally upon second straight portion 41 in the direction of double arrow 59 and/or rotated in the direction of double arrow 67 providing new positions for mirror mounting means 4.

It is readily observed therefore, that by utilizing each of biasing means 46 of arm mounting means 9 and clamping means 37 of mirror mounting means 4, mirror 11 may be placed in any rotational or lateral relationship with respect to projecting portion 13 within the confines of straight portions 1 and 41 of arm 10, thereby providing optimal rearward viewing and the safe operation of a vehicle.

Figure 6:
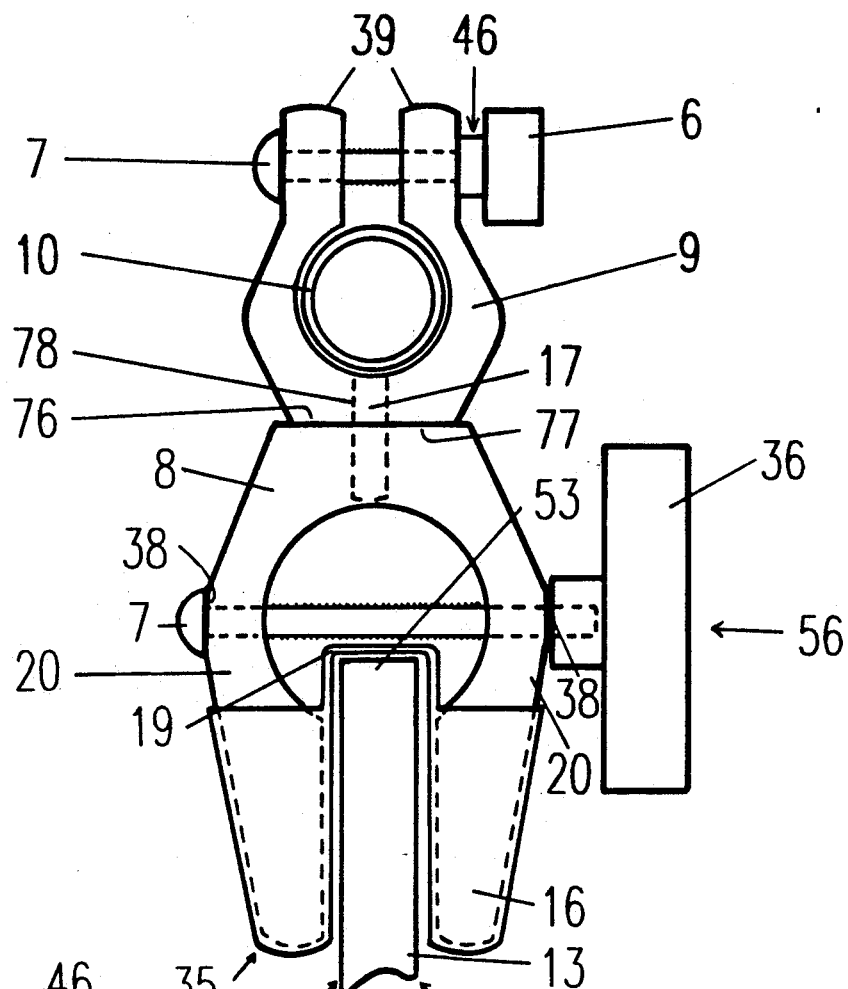
FIG. 6 is an enlarged view of the viewing device mounting means of this invention having surface protecting means thereon.

Referring now to FIG. 6, arm mounting means 9 has biasing means 46 associated therewith comprising bolt 7 and thumb screw 6 adapted to engage projections 39 of arm mounting means 9 whereby said biasing means 46 is adapted to releasably affix arm 10 to arm mounting means 9. In a similar manner, viewing device fixing means 8 has biasing means 56 adapted to releasably affix viewing device fixing means 8 to projecting portion 13. Viewing device fixing means 8 comprises biasing means 56 and pincer clamping means 35 having surface mounting means 20 oppositely disposed on either side of projecting portion 13. Biasing means 56 comprises bolt 7 and a T-shaped nut 36 adapted to engage opposite portions 38 of viewing device fixing means 8. Biasing means 56 thereby biases opposite portions 38 one towards the other causing surface mounting means 20 to engage the surfaces 51 and 52 of the projecting portion 13.

Figure 8:
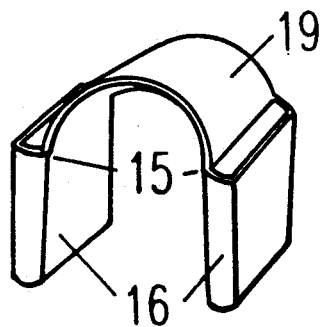
FIG. 8 is a perspective view of one surface protecting means employed with the device of this invention.

A surface protecting means 16 is adapted to be disposed over surface mounting means 20 such that surfaces 51 and 52 of projecting portion 13 may be protected thereby and viewing device fixing means 8 may be contiguously engaged therewith. As best seen in FIG. 8, surface protecting means 16 may further be joined on at least a portion 15 thereof providing edge protecting means 19 therebetween. Edge protecting means 19 is adapted to protect the edge 53 of projecting portion 13 from damage by the threads of bolt 7 of biasing means 56.

Figure 7:
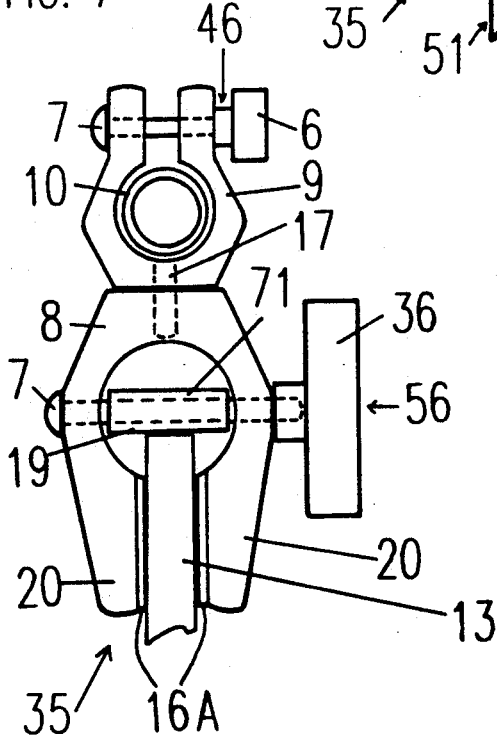
FIG. 7 is a view similar to FIG. 6 showing alternate means for surface protecting means.

In FIG. 7, surface mounting means 20 of viewing device fixing means 8 may have alternate surface protecting means 16A disposed thereon such as cork and/or rubber strips adhesively affixed to the inner surface thereof. Edge protecting means 19A is a soft hollow tube 71 adapted to be placed around the threads of bolt 7 thereby protecting the edge 53 of projecting portion 13 from damage by the threads of bolt 7 of biasing means 56.

Figure 4:
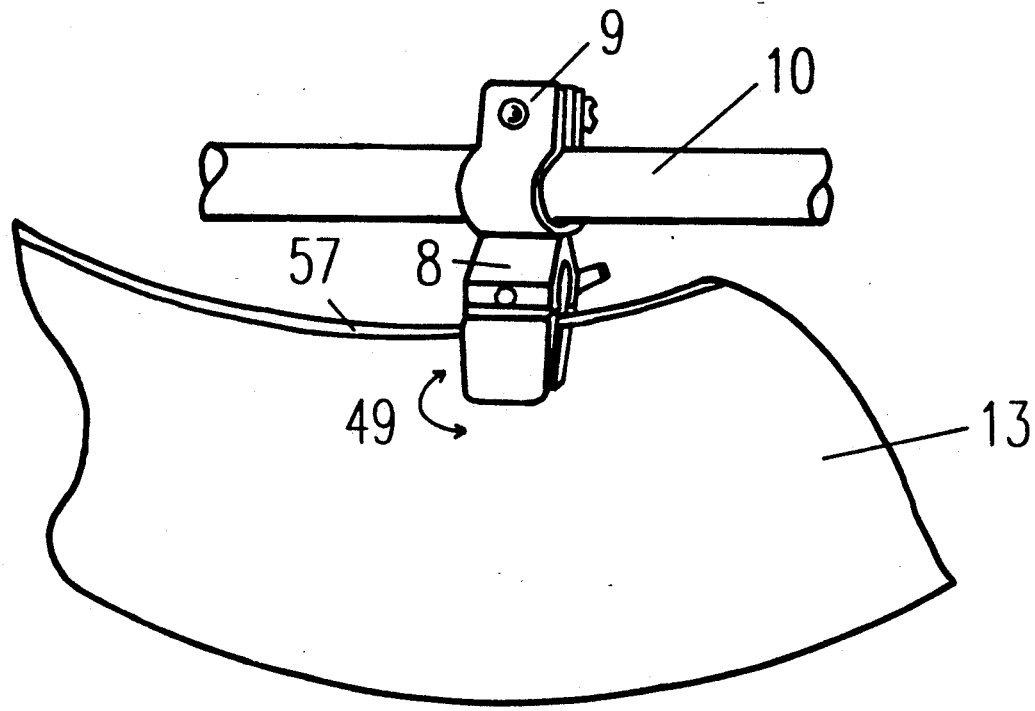
FIG. 4 is a partial view showing one viewing device mounting means of this invention affixed to a curved projecting portion.
Figure 9:
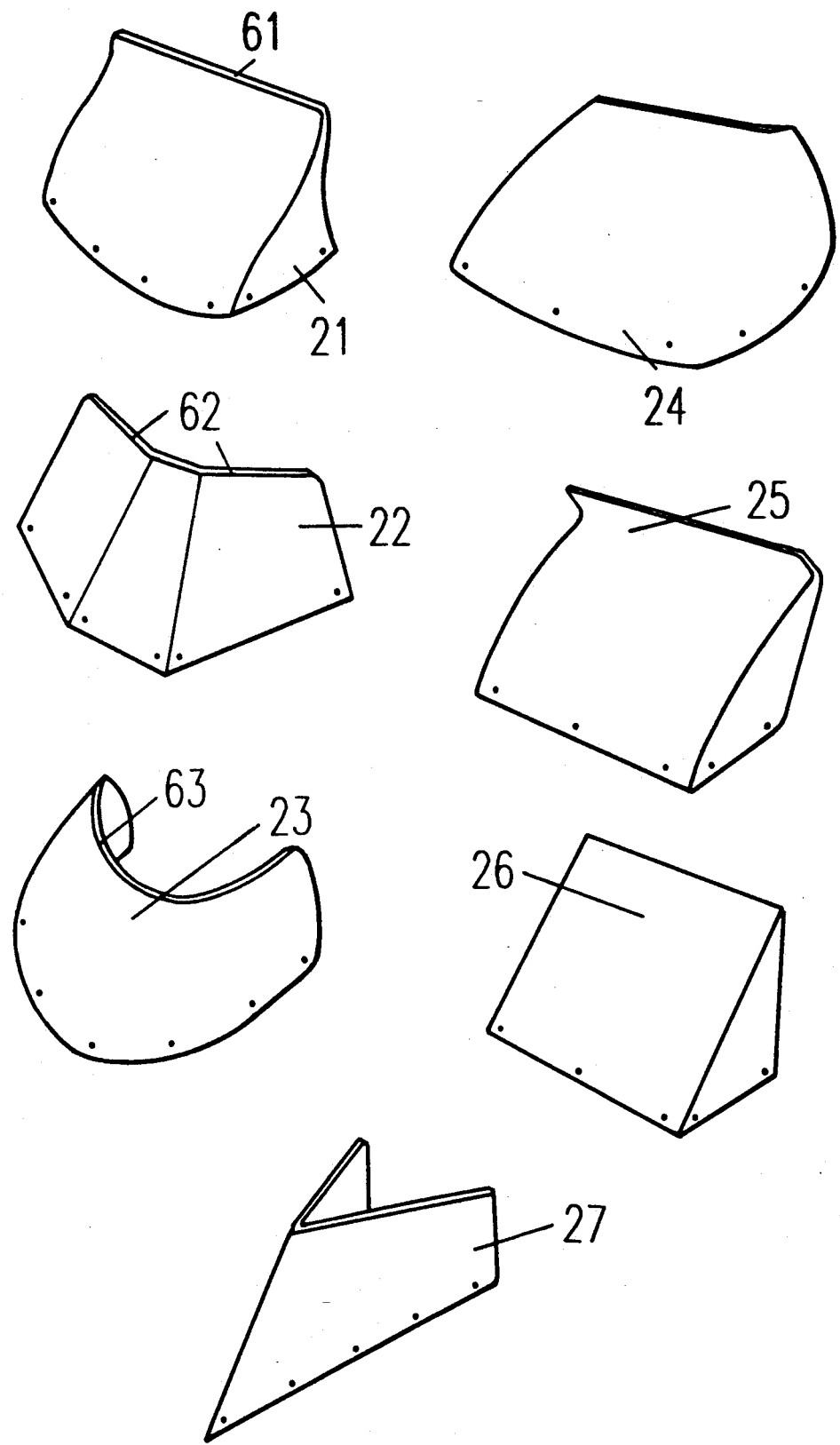
FIG. 9 is a perspective view of a variety of projecting portions of various personal recreational vehicles.

Referring now to FIG. 4, arm mounting means 9 moves relative to viewing device fixing means 8 upon set screw 17 in order to accommodate the various different projecting portions 13 of portion 65 shown in FIG. 9. Viewing device fixing means 8 has set screw 17 disposed in the top surface 76 thereof and arm mounting means 9 has a hole 78 disposed in the bottom surface 77 thereof for receiving set screw 17 therein providing means for arm mounting means 9 to move relative to viewing device fixing means 8.

Figure 5:
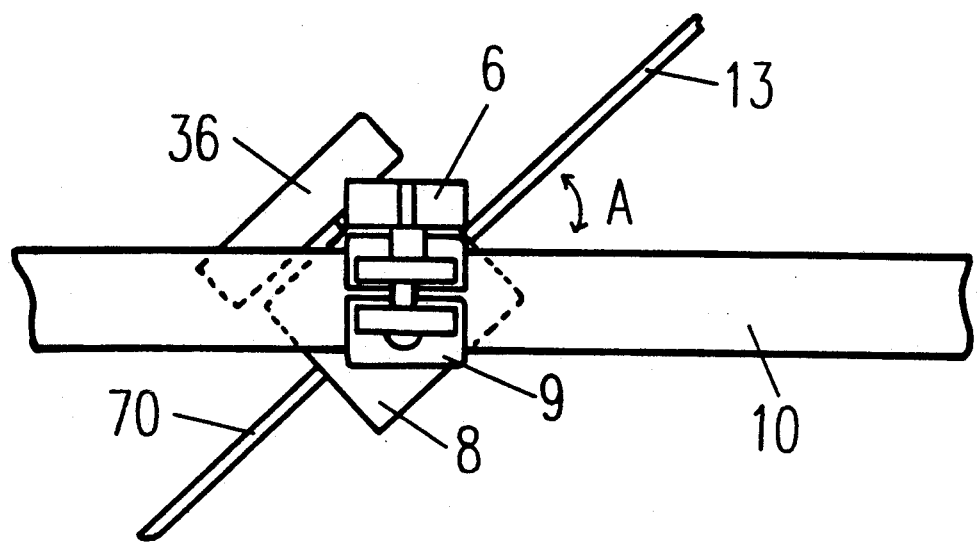
FIG. 5 is a top view of one viewing device mounting means of this invention showing relative displacement between two parts of the mounting means.

As can be seen in FIG. 4 the curved portion 57 of projecting portion 13 is not parallel with arm mounting means 9. FIG. 5 shows the angular relationship typically encountered when placing rearward viewing device 50 upon one of the projecting portions of FIG. 9. Viewing device fixing means 8 must be rotated from arm mounting means 9 in the direction of double arrow 49 by angle A between fragmented portion 70 and arm 10 in order to place rearward viewing device 50 in a proper attitude relative to the projecting portion 13 of a vehicle. It is understood here that viewing device fixing means 8 need be rotated in the direction of double arrow 49 only plus or minus 90° from position parallel with arm 10 as any greater rotation can be achieved with an opposite orientation of viewing device fixing means 8.

Referring now to FIG. 9, it will be noted that viewing device fixing means 8 must be oriented in various angular relationships with arm mounting means 9 in order to accommodate a variety of shapes of wind deflectors 21–27 shown. For instance, the up-turned wind deflector 21 will have a planar straight surface 61 on the top thereof wherein viewing device fixing means 8 and arm mounting means 9 will be disposed in parallel relation. However, in the triple pane wind deflector 22, an angular relationship between viewing device fixing means 8 and arm mounting means 9 is necessary in order that arm 10 may span across and be affixed to the two surfaces 62 of triple pane wind deflector 22. In a similar fashion, in the curved wind deflector 23, an angular relationship between viewing device fixing means 8 and arm mounting means 9 is again necessary in order to accommodate arm 10 between a first viewing device fixing means 8 and a second viewing device fixing means 8 disposed over another portion of top surface 63 of curved wind deflector 23.

In this manner, arm mounting means 9 may be disposed in any relative orientation to viewing device fixing means 8 whereby said rearward viewing device 50 may also be in any orientation relative to said vehicle.

Furthermore, arm 10 is adapted to be rotated within arm mounting means 9 and adapted to be affixed thereto with biasing means 46 in order to accommodate the orientation of the upper surface of the various wind deflectors 21–27 of FIG. 9. For instance, the orientation of arm 10 within arm mounting means 9 must be different for the compound curved wind deflector 24 than for the back-curved wind deflector 25 in order that the mirror 11 may be utilized in a manner consistent with its intended purpose to observe behind the vehicle.

An alternative embodiment for the rearward viewing device 50 is provided in FIG. 10 through FIG. 15 whereby elements of the preferred embodiment described above are identified with identical numbers followed by an alphabetic designation. For instance, referring to FIG. 10, the rearward viewing device 50A is adapted to be mounted upon a portion 65 of a vehicle such as console 28 by means of a viewing device mounting means 12A. Rearward viewing device 50A comprises viewing device mounting means 12A, arm 10A, mirror mounting means identical to mirror mounting means 4 (not shown) and mirror 11A mounted thereon.

Viewing device mounting means 12A comprises arm mounting means 9A and viewing device fixing means 8A wherein viewing device fixing means 8A is adapted to be releasably attached to a flat surface 55 of portion 65 of a vehicle such as console 28. Viewing device fixing means 8A may be attached to said flat surface 55 by any means known in the art such as by screws 72 disposed through holes 32 in viewing device fixing means 8A whereby one surface 73 of viewing device fixing means 8A abuts said flat surface 55.

As best shown in FIG. 11, arm mounting means 9A and viewing device fixing means 8A are provided in one piece construction such as by cutting, molding or extruding from a single piece of material 30. Arm mounting means 9A has biasing means 46A adapted to releasably clamp said arm 10A on a first straight portion 1A thereof in said arm mounting means 9A providing means for said arm 10A to be slidably and rotatably mounted therein. Biasing means 46A comprises T-shaped bolt 66A disposed within a threaded hole 74 in arm mounting means 9A. Arm 10A may be released from arm mounting means 9A by loosening T-shaped bolt 66A such that the end 75 of T-shaped bolt 66A moves out of contact with the straight portion 1A of arm 10A.

Arm 10A has second straight portion 41A displaced from said first straight portion 1A by a curved portion 2A. Arm 10A is adapted to be placed within arm mounting means 9A and moved in a direction of double ended arrow 58A for adjusting rearward viewing device 50A upward or downward as required for the operator. Furthermore, arm 10A is adapted to be rotated within arm mounting means 9A as shown by double arrow 68A to position mirror 11 in the proper attitude for rearward viewing. Arm 10A may be affixed in any position by tightening T-shaped bolt 66A such that end 75 engages first straight portion 1A of arm 10A.

Mirror 11 is adapted to be placed on second straight portion 41A in a manner similar to second straight portion 41 of FIG. 2 and need not be further described here as the orientation of mirror 11 shown in FIG. 3 and FIG. 10 is identical. It is appreciated here, that rearward viewing device 50A may provide for any orientation of mirror 11 when rearward viewing device 50A is mounted upon a flat surface 55 of console 28 of a vehicle thereby providing for safe operation of said vehicle.

A vibration dampening collar 29 may be disposed upon said first straight portion 1A of rearward viewing device 50A to prevent the oscillation of rearward viewing device 50A. Dampening collar 29 is preferably made of a single piece of foam rubber or the like and is adapted to frictionally fit tightly upon said first straight portion 1A of arm 10A. Dampening collar 29 may be moved axially upon said first straight portion 1A to provide for different dampening effects associated with different weather and surface conditions.

FIG. 12, 13 and 14 present an alternative embodiment to the viewing device mounting means 12A of FIG. 10 by providing viewing device mounting means 12B wherein arm mounting means 9B and viewing device fixing means 8B are formed from a single piece of material 31. Arm mounting means 9B has opposed projecting portions 39B with biasing means 46B disposed therethrough. Biasing means 46B comprises T-handle bolt 66B disposed through one projection 39B and threaded into another projection 39B. Arm 10A is disposed within arm mounting means 9B and affixed thereto by tightening T-handle bolt 66B in a manner similar to affixing arm 10 to arm mounting means 9 of FIG. 1, or affixing arm 10A to arm mounting means 9A of FIG. 10.

Viewing device mounting means 12C shown in FIG. 15 is adapted to be fixed upon a flat surface 55 of console 28 in a manner described above and wherein each of arm mounting means 9C is affixed to viewing device fixing means 8C by a set screw 17 as shown in FIG. 6. Arm mounting means 9C each has projections 39C through which a bolt (not shown) is passed with thumb screw 6C provided on an open end thereof. As is provided in arm mounting means 9 of FIG. 6, arm 10A may be disposed within arm mounting means 9C and be affixed thereto by tightening thumb screw 6C biasing one projection 39C of biasing means 46C toward the other projection 39C in a manner described above.

It is appreciated here that viewing device mounting means 12A of FIG. 11 or 12B of FIG. 12 may be made of separate pieces as the viewing device mounting means 12C of FIG. 15 by a providing flat plate 33, with tubular means affixed thereto by means such as welding, gluing or other thermosetting means and providing biasing means 46A or 46B therein.

Methods of providing the rearward viewing device 50 are now described. The rearward viewing device 50 having adjusting means 40 of this invention comprises separate and distinct parts, viewing device mounting means 12, arm 10, mirror mounting means 4 and mirror 11. Viewing device mounting means 12 further comprises a viewing device fixing means 8 and an arm mounting means 9. Viewing device fixing means 8 is formed from a single piece of material such as thermoplastics, metal or wood but preferably is molded from glass filled nylon. Viewing device fixing means 8 is provided with surface protecting means 16 or 16A, thereon and has bolt 7 disposed through opposite portions 38 thereof. Bolt 7 has a T-shaped nut 36 disposed on the open end thereof and is adapted to bias one opposite portion 38 toward the other opposite portion 38 causing surface mounting means 20 to move into engagement with the surfaces 51 and 52 of a projecting portion 13 of a vehicle. Viewing device fixing means 8 further has a set screw 17 disposed in the top surface 76 thereof for rotatably mounting arm mounting means 9 thereon.

Surface protecting means 16 is molded of a soft plastic material having a high surface friction coefficient whereby said soft plastic material provides cushioning and shock resistance for viewing device fixing means 8. Cork, rubber or soft plastic pads may be affixed to the interior surfaces of surface mounting means 20. Edge protecting means 19 may be formed as a bridge portion extending from opposing portions 15 of molded soft plastic surface protecting means 16 or may be formed from a separate tubular material adapted to be placed around bolt 7 of biasing means 56 of viewing device fixing means 8.

In a similar fashion, arm mounting means 9 is molded from a single piece of glass filled nylon but may of course be formed from other available materials such as other thermoplastics, metal or wood. Arm mounting means 9 has projections 39 in spaced relationship with bolt 7 disposed therethrough. Bolt 7 has thumb screw 6 disposed on the open end thereof and is adapted to bias one of said projections 39 toward the other of said projections 39 in order to clamp arm 10 within arm mounting means 9. Arm mounting means 9 has a hole 78 disposed in the bottom surface 77 thereof for receiving set screw 17 therein.

Viewing device fixing means 8 and arm mounting means 9 may be affixed in rotational relationship by other means known in the art such as by a rivet or pin disposed through hole 78 of arm mounting means 9 and into top surface 76 of viewing device fixing means 8.

Arm 10 is preferably made of a single piece of tubing or rod of a material such as aluminum, steel, thermoplastics, rubber or wood however, lightweight durable aluminum tubing is preferred. Arm 10 has a first straight portion 1 formed on one end thereof and further has a curved portion 2 of approximately 45° with a radius of two inches formed at the end of said first straight portion 1. A second straight portion 41 is formed after curved portion 2 providing means for mounting mirror mounting means 4 thereon. A third straight portion 34 may be formed in arm 10 by providing second curved portion 3 in first straight portion 1 or second straight portion 41. Second curved portion 3 is formed at an angle of approximately 45° from the plane of curved portion 2 but in an opposite direction thereof, thereby providing arm 10 with parallel and offset straight portions 1 and 41. In this manner, the adjusting means 40 provides for adjustment of rearward viewing device 50 to any position desired by the operator.

Arm 10, when made to tubing, has end caps 18 frictionally engaged in both ends thereof. End caps 18 may be formed from any suitable material but preferably are molded of a thermoplastic material. Such end caps 18 are readily available on the market.

Mirror mounting means 4 is formed from a single piece of material such as thermoplastics, metal or wood but preferably is molded of high impact glass filled nylon. Mirror mounting means 4 has a hole 42 formed therethrough for receiving said straight portion 41 of said arm 10. Mirror mounting means 4 further has clamping means 37 disposed in a threaded hole in the rear surface 69 thereof for receiving a T-handle bolt 64. T-handle bolt 64 is adapted to engage the outer surface of arm 10 and affix mirror mounting means 4 thereto. Mirror mounting means 4 further has a receiving socket 44 formed in the side opposite rear surface 69 for receiving a protruding stud 5 of a mirror 11. A set screw 43 is provided in one surface 81 of a mirror holder 80 of mirror mounting means 4 for rigidly affixing stud 5 therein.

While the forms and methods of this invention now preferred have been illustrated and described as required by the Patent Statute, it is to be understood that other forms and methods can be utilized and still fall within the scope of the appended claims.

I claim:

1. In a rearward viewing device adapted to be mounted upon a portion of a vehicle, the improvement wherein said rearward viewing device comprises adjusting means having at least one arm, at least one mirror, at least one mirror mounting means and at least one viewing device mounting means, said viewing device mounting means being adapted for releasably attaching said adjusting means to said portion of said vehicle wherein said adjusting means provides for any orientation of said mirror and rapid reorientation thereof, said viewing device mounting means further comprises arm mounting means associated with said arm and viewing device fixing means rotatably affixed to said arm mounting means wherein said arm is adapted to slide within and thereby relative to said arm mounting means.

2. In a rearward viewing device adapted to be mounted upon a portion of a vehicle, the improvement wherein said rearward viewing device comprises adjusting means having at least one arm, at least one mirror, at least one mirror mounting means and at least one viewing device mounting means, said viewing device mounting means being adapted for releasably attaching said adjusting means to said portion of said vehicle wherein said adjusting means provides for any orientation of said mirror and rapid reorientation thereof wherein said mirror mounting means is adapted to slide upon and thereby relative to said arm.

3. In a rearward viewing device adapted to be mounted upon a portion of a vehicle, the improvement wherein said rearward viewing device comprises adjusting means having at least one arm, at least one mirror, at least one mirror mounting means and at least one viewing device mounting means, said viewing device mounting means being adapted for releasably attaching said adjusting means to said portion of said vehicle wherein said adjusting means provides for any orientation of said mirror and rapid reorientation thereof, said viewing device mounting means further comprises arm mounting means associated with said arm and viewing device fixing means rotatably affixed to said arm mounting means wherein said viewing device fixing means further comprises at least one pair of opposed surface mounting means adapted to receive a projecting portion therebetween.

4. In a rearward viewing device as described in claim 3 wherein said pair of opposed surface mounting means comprises pincer clamping means.

5. In a rearward viewing device as described in claim 4 wherein said pincer clamping means of surface mounting means have surface protecting means disposed thereon.

6. In a rearward viewing device as described in claim 5 wherein said surface protecting means are joined together on at least one portion thereof.

7. In a rearward viewing device as described in claim 6 wherein said surface protecting means provides edge protecting means in said one portion thereof.

8. In a rearward viewing device adapted to be mounted upon a portion of a vehicle, the improvement wherein said rearward viewing device comprises adjusting means having at least one arm, at least one mirror, at least one mirror mounting means and at least one viewing device mounting means, said viewing device mounting means being adapted for releasably attaching said adjusting means to said portion of said vehicle wherein said adjusting means provides for any orientation of said mirror and rapid reorientation thereof, said viewing device mounting means further comprises arm mounting means associated with said arm and viewing device fixing means rigidly affixed together and adapted to be permanently mounted upon a flat surface of said portion of said vehicle.

9. In a rearward viewing device as described in claim 8 wherein said arm is adapted to slide within and thereby relative to said arm mounting means.

10. In a rearward viewing device as described in claim 8 wherein said arm is adapted to rotate within said arm mounting means.

11. In a rearward viewing device as described in claim 8 wherein said viewing device mounting means comprises a flat plate is adapted to be mounted upon a flat surface of said portion.

12. In a rearward viewing device adapted to be mounted upon a portion of a vehicle, the improvement wherein said rearward viewing device comprises adjusting means having at least one arm, at least one mirror, at least one mirror mounting means and at least one viewing device mounting means, said viewing device mounting means being adapted for releasably attaching said adjusting means to said portion of said vehicle wherein said adjusting means provides for any orientation of said mirror and rapid reorientation thereof, said arm has a first straight portion, a second straight portion and at least one curved portion separating said first straight portion and said second straight portion wherein said first straight portion and said second straight portion of said arm are parallel and offset, separated by said first curved portion, a third straight portion and a second curved portion.

* * * * *